(12) United States Patent
Rakuff et al.

(10) Patent No.: US 10,859,091 B2
(45) Date of Patent: Dec. 8, 2020

(54) SYSTEM HAVING MACHINE AND FAN WITH AN AXIAL FLOW INDUCER

(71) Applicant: ABB Schweiz AG, Baden (CH)

(72) Inventors: Stefan Rakuff, Windsor, CT (US); Joe J. Liou, Windsor, CT (US); Qimin Dong, Greer, SC (US)

(73) Assignee: ABB Schweiz AG, Baden (CH)

( * ) Notice: Subject to any disclaimer, the term of this patent is extended or adjusted under 35 U.S.C. 154(b) by 190 days.

(21) Appl. No.: 15/994,649

(22) Filed: May 31, 2018

(65) Prior Publication Data

US 2019/0368502 A1 Dec. 5, 2019

(51) Int. Cl.

| | |
|---|---|
| *F04D 29/28* | (2006.01) |
| *F04D 29/22* | (2006.01) |
| *F04D 29/30* | (2006.01) |
| *F04D 29/42* | (2006.01) |
| *F04D 29/44* | (2006.01) |
| *H02K 9/14* | (2006.01) |
| *H02K 9/06* | (2006.01) |
| *F16H 57/04* | (2010.01) |
| *F16H 57/02* | (2012.01) |

(52) U.S. Cl.
CPC ....... *F04D 29/2238* (2013.01); *F04D 29/281* (2013.01); *F04D 29/30* (2013.01); *F04D 29/4226* (2013.01); *F04D 29/444* (2013.01); *H02K 9/06* (2013.01); *H02K 9/14* (2013.01); *F16H 57/0416* (2013.01); *F16H 2057/02026* (2013.01)

(58) Field of Classification Search
CPC .. F04D 29/2238; F04D 29/444; F04D 25/082; F04D 19/002
See application file for complete search history.

(56) References Cited

U.S. PATENT DOCUMENTS

| | | | | |
|---|---|---|---|---|
| 1,986,867 | A | * 1/1935 | Walsh | ............. B64C 11/001 416/193 R |
| 2,494,200 | A | * 1/1950 | Nils | ................. H02K 9/06 310/52 |
| 4,128,363 | A | 12/1978 | Fujikake et al. | |
| 4,670,677 | A | * 6/1987 | Snider | ............... H02K 9/06 310/60 R |

(Continued)

FOREIGN PATENT DOCUMENTS

| | | |
|---|---|---|
| EP | 3006743 A2 | 4/2016 |
| GB | 634186 A | 3/1950 |

(Continued)

OTHER PUBLICATIONS

English translation of WO2016106468A1 (Year: 2016).*

(Continued)

*Primary Examiner* — Eldon T Brockman
*Assistant Examiner* — Wesley Le Fisher
(74) *Attorney, Agent, or Firm* — Taft Stettinius & Hollister LLP; J. Bruce Schelkopf

(57) ABSTRACT

A system includes a machine; a centrifugal fan, the centrifugal fan having a plurality of centrifugal fan blades and being constructed to generate a cooling airflow for cooling the machine; and an axial flow inducer disposed on the plurality of centrifugal fan blades, wherein the axial flow inducer is constructed generate an axial flow through a central portion of the centrifugal fan.

10 Claims, 4 Drawing Sheets

(56) References Cited

U.S. PATENT DOCUMENTS

| | | | |
|---|---|---|---|
| 5,188,508 A | 2/1993 | Scott et al. | |
| 5,387,087 A * | 2/1995 | Chen | F04D 25/166 |
| | | | 416/179 |
| 6,494,681 B2 | 12/2002 | Barry et al. | |
| 7,008,189 B2 | 3/2006 | Jarrah et al. | |
| 9,574,565 B2 | 2/2017 | Teramoto et al. | |
| 9,716,420 B2 * | 7/2017 | Cocks | H02K 9/14 |
| 9,771,951 B2 * | 9/2017 | Ho | F04D 27/008 |
| 2002/0094275 A1 * | 7/2002 | Bostwick | F04D 29/281 |
| | | | 416/175 |
| 2002/0141888 A1 * | 10/2002 | Bostwick | F04D 17/105 |
| | | | 417/366 |
| 2005/0287003 A1 * | 12/2005 | Horng | F04D 29/282 |
| | | | 416/187 |
| 2008/0286130 A1 | 11/2008 | Purvines | |
| 2013/0259667 A1 * | 10/2013 | Huang | F04D 19/002 |
| | | | 415/185 |
| 2014/0064941 A1 * | 3/2014 | Parodi | F04D 25/082 |
| | | | 415/177 |
| 2018/0187693 A1 * | 7/2018 | Lin | F04D 29/281 |
| 2019/0195230 A1 * | 6/2019 | Inouchi | F04D 17/025 |

FOREIGN PATENT DOCUMENTS

| | | | | |
|---|---|---|---|---|
| WO | 2016106468 A1 | 7/2016 | | |
| WO | WO-2016106468 A1 * | 7/2016 | | F04D 29/26 |
| WO | WO-2016106469 A1 * | 7/2016 | | F04B 39/06 |

OTHER PUBLICATIONS

English Translation of WO2016106469A1 (Year: 2016).*
European Patent Office, Extended European Search Report in corresponding application No. 19177703.6, dated Oct. 23, 2019, 9 pp.

* cited by examiner

SYSTEM HAVING MACHINE AND FAN WITH AN AXIAL FLOW INDUCER

TECHNICAL FIELD

The present application relates generally to machine systems and more particularly, but not exclusively, to systems having a machine and a fan for cooling the machine.

BACKGROUND

Machine systems, remain an area of interest. Some existing systems have various shortcomings, drawbacks and disadvantages relative to certain applications. For example, in some machine system configurations, the machine may operate at a higher than desirable temperatures. Accordingly, there remains a need for further contributions in this area of technology.

SUMMARY

One embodiment of the present invention is a unique system having a machine and a fan for cooling the machine. Another embodiment is another unique system having a machine and a fan for cooling the machine. Other embodiments include apparatuses, systems, devices, hardware, methods, and combinations for machine systems having cooling fans. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
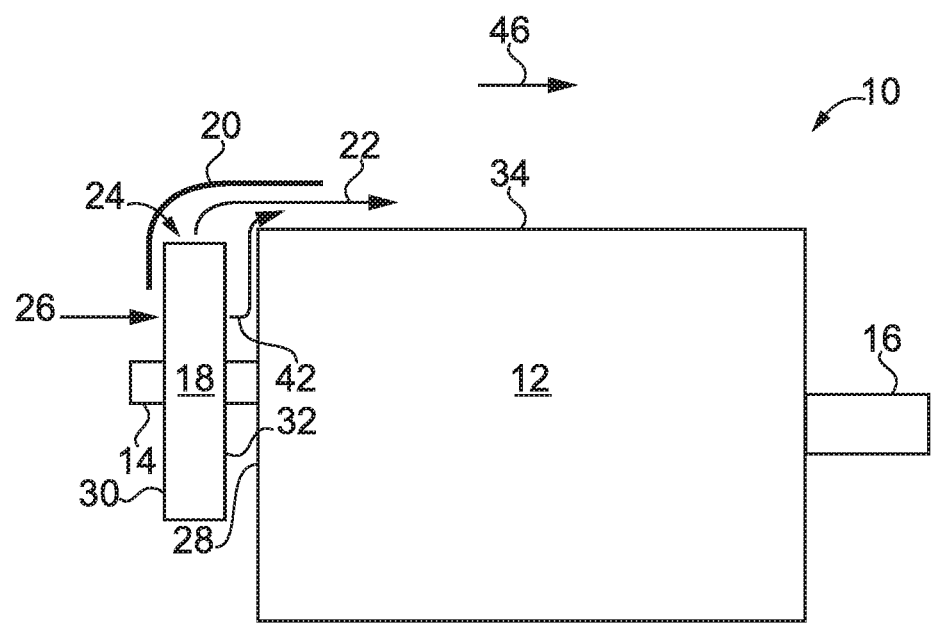
FIG. 1 schematically illustrates some aspects of a non-limiting example of a system in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a system 10 in accordance with an embodiment of the present invention is schematically illustrated. System 10 includes a machine 12. In one form, machine 12 is a reducing gearbox. In other embodiments, machine 12 may be another type of gearbox, e.g., a speed-increasing gearbox. In still other embodiments, machine 12 may be an electrical machine, such as a motor, a generator or a motor/generator. In yet other embodiments, machine 12 may be another type of machine.

In the form of a gearbox, machine 12 includes a shaft 14 extending therefrom, a shaft 16 extending therefrom, a fan 18 and a shroud 20. Shaft 14 is an input shaft. Shaft 16 is an output shaft. Fan 18 is constructed to, when rotated, generate a cooling airflow 22 for cooling machine 12. In one form, fan 18 is mounted on shaft 14. In other embodiments, fan 18 may be mounted on shaft 16 or mounted on another device or structure that is operative to rotate fan 18. In some embodiments, fan 18 is a centrifugal fan. In other embodiments, fan 18 is an axial/centrifugal fan. Fan 18 includes a radially outer portion 24 constructed to generate a centrifugal flow. Fan 18 also includes a central portion 26 constructed to generate an axial flow (e.g., axial flow 42, described below) of the cooling air in a direction (e.g., axial direction 46) toward a side wall 28 of machine 12 for extracting heat from the face, which merges with and becomes a part of cooling airflow 22. Fan 18 includes an inlet side 30 that draws in air for generating cooling airflow 22, and has a back side 32 opposite inlet side 30 and facing machine 12. Shroud 20 is constructed to direct the cooling airflow 22 over an outer surface 34 of machine 12.

Figure 2A:
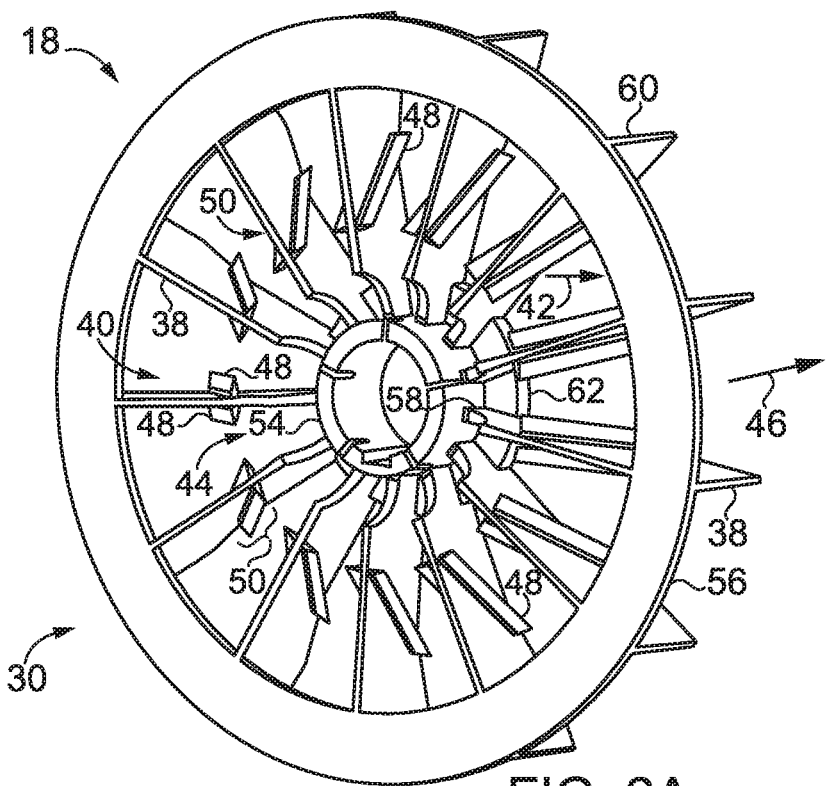
FIGS. 2A and 2B illustrate respective inlet side and back side perspective views depicting some aspects of a non-limiting example of a fan in accordance with an embodiment of the present invention.
Figure 2B:
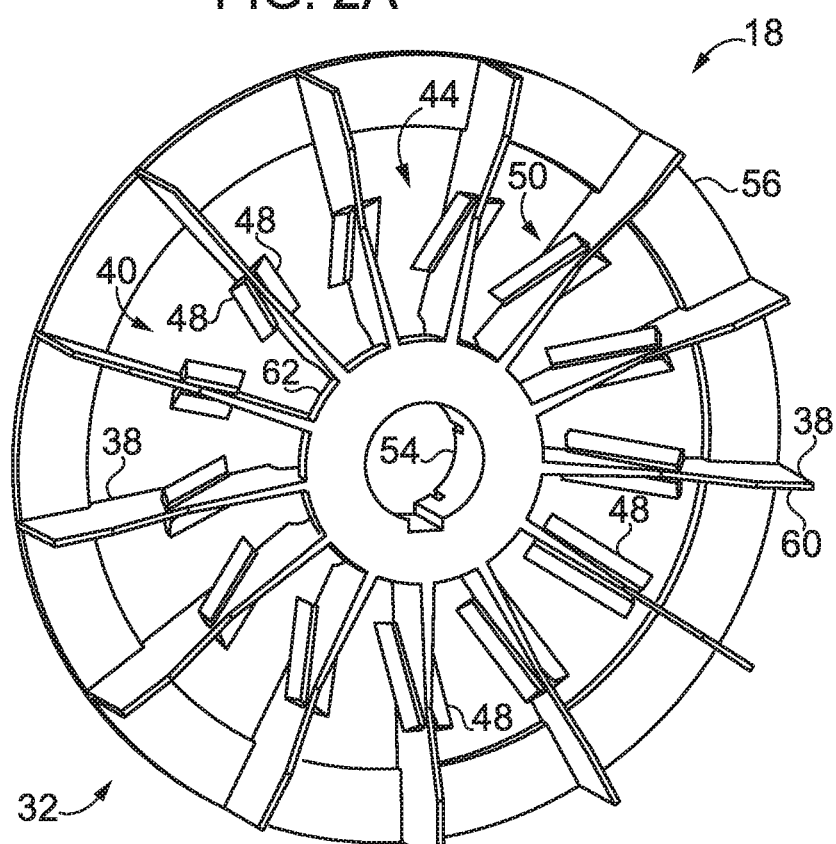

Referring also to FIGS. 2A and 2B, respective inlet side and back side perspective views illustrate some aspects of a non-limiting example of fan 18 in accordance with an embodiment of the present invention. Fan 18 includes a plurality of centrifugal fan blades 38. In the embodiment of FIGS. 2A and 2B, fan 18 is a centrifugal fan, and includes an axial flow inducer 40 disposed on the plurality of centrifugal fan blades 38. In one form, centrifugal fan blades 38 are radial blades, i.e., blades that have extents in the radial and axial directions, but not in the circumferential direction about input shaft 14.

Axial flow inducer 40 is constructed to induce or generate an axial flow 42, e.g., an axial cooling airflow portion of the cooling airflow 22 generated by fan 18, through a central portion 44 of fan 18. In some embodiments, axial flow inducer 40 may also or alternatively generate an axial flow through an inner and/or outer portion of fan 18. In some embodiments, axial flow inducer 40 induces or generates axial flow 42 by deflecting radial or centrifugal flow generated at a radially inner portion of fan 18 by radially inner portions of centrifugal fan blades 38.

Axial flow 42 provides cooling to a portion of machine 12. For example, with some machines 12 in the form of a gearbox, a pinion bearing is located inside machine 12 on a portion of input shaft 14 inside machine 12 on the opposite and gearbox-internal side of side wall 28 (not shown), which generates heat, and for which cooling is desired. Axial flow inducer 40 is constructed to provide axial flow 42 and direct axial flow 42 toward side wall 28 to impinge upon side wall 28. For example, axial flow inducer 40 is constructed to generate axial flow 42 in an axial direction 46 that is parallel to the axis of rotation of input shaft 14. Because the axial flow 42 is generated in the central portion 44 of fan 18, it impinges upon side wall 28, e.g., in a central portion of side wall 28 opposite the pinion bearing. By impinging upon side wall 28, axial flow provides cooling of such a pinion bearing and/or any other machine 12 components adjacent to or mounted internally or externally on side wall 28 of machine 12 by convecting heat from side wall 28 of machine 12.

In the embodiment of FIGS. 2A and 2B, axial flow inducer 40 includes a plurality of axial flow vanes 48. Each axial flow vane 48 is disposed on a centrifugal fan blade 38 of the plurality of centrifugal fan blades 38. In one form, each axial flow vane 48 is disposed on a radially central portion 50 of each centrifugal fan blade 38. In other embodiments, axial flow vanes 48 may additionally or alternatively be disposed on other portions of centrifugal fan blades 38. In one form, axial flow vanes 48 are integral with centrifugal fan blades 38. In other embodiments, axial flow vanes 48 may be attached or affixed to centrifugal fan blades 38. Axial flow vanes 48 are constructed to deflect radial flow generated by centrifugal fan blades 38 into axial direction 46 to generate axial flow 42. Fan 18 of the embodiments of FIGS. 2A and 2B is constructed to generate axial flow 42 in axial direction 46 regardless of the direction of rotation of fan 18. Axial flow vanes 48 are constructed to generate axial flow 42 to impinge on side wall 28 for cooling of side wall 28.

Centrifugal fan 18 includes a hub 54 and a stabilizer ring 56. Hub 54 is mounted on input shaft 14. Centrifugal fan blades 38 extend from hub 54 to stabilizer ring 56. Stabilizer ring 56 is constructed to stabilize the tip end 60 of each centrifugal fan blade 38, e.g., by preventing or reducing a dynamic response or vibration in centrifugal fan blades 38. Each centrifugal fan blade 38 has a hub end 58 and a tip end 60. Each centrifugal fan blade 38 is coupled to hub 54 at hub end 58, and is coupled to stabilizer ring 56 at tip end 60. In one form, each centrifugal fan blade 38 is integral with hub 54 and with stabilizer ring 56. In other embodiments, each centrifugal fan blade 38 is may be attached or affixed to hub 54 and/or stabilizer ring 56.

Fan 18 also includes a support disk 62. Support disk 62 is constructed to support centrifugal fan blades 38, e.g., by supporting centrifugal or radial loads and other loads, e.g., circumferential, axial and pressure loads, in centrifugal fan blades 38 resulting from the rotation of fan 18 and the generation of axial flow 42 and the generation of cooling air 22. Support disk 62 is coupled to hub 54. In one form, support disk 62 is integral with integral with hub 54. In other embodiments, support disk 62 may be attached or affixed to hub 54. The hub end 58 of each centrifugal fan blade 38 is coupled to support disk 62. In one form, centrifugal fan blades 38 are integral with support disk 62. In other embodiments, centrifugal fan blades 38 may be attached or affixed to support disk 62.

Figure 3A:
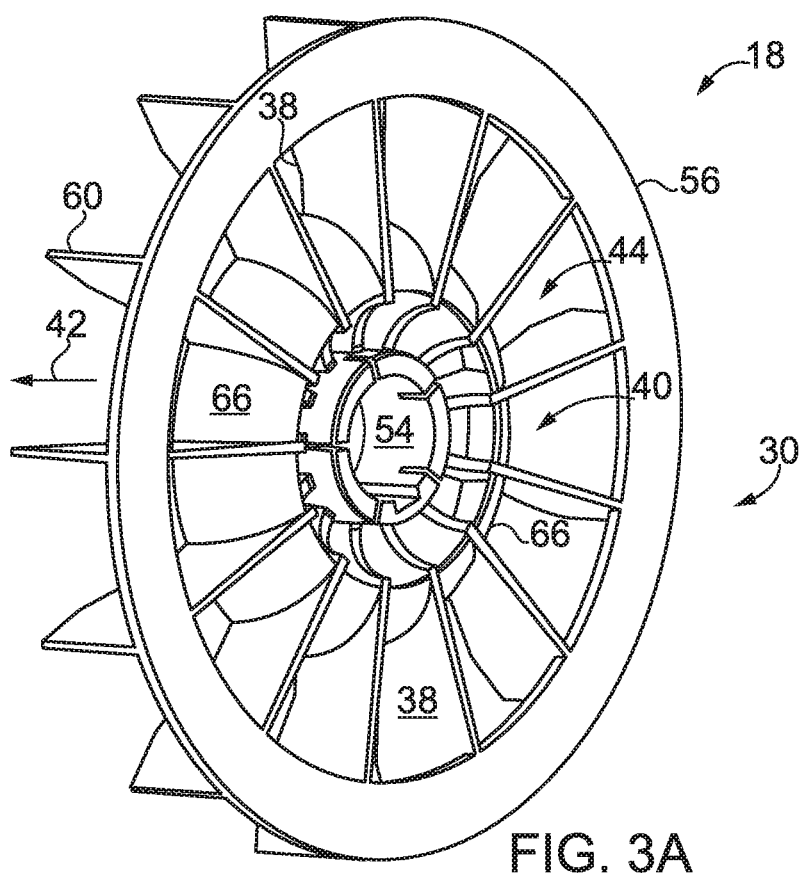
FIGS. 3A and 3B illustrate respective back side perspective and partial cross-sectional views depicting some aspects of non-limiting example of a fan in accordance with another embodiment of the present invention.
Figure 3B:
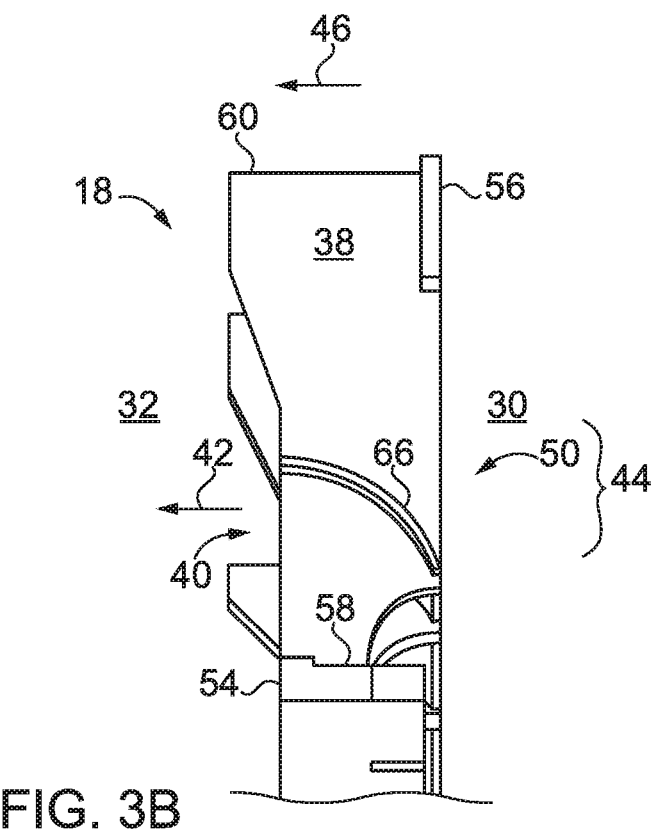

Referring also to FIGS. 3A and 3B, respective back side perspective and partial cross-sectional views illustrate some aspects of non-limiting example of fan 18 in accordance with another embodiment of the present invention. In the embodiment of FIGS. 3A and 3B, axial flow inducer 40 includes a deflector ring 66. Deflector ring 66 bisects each centrifugal fan blade 38 between hub 54 and stabilizer ring 56. In particular, deflector ring 66 bisects each centrifugal fan blade 38 at radially central portion 50 of each centrifugal fan blade 38 between hub end 58 and tip end 60. In some embodiments, deflector ring 66 may also or alternatively bisect each centrifugal fan blade at a radially inner and/or outer portion of each centrifugal fan blade 38.

Deflector ring 66 is constructed to deflect flow, e.g., cooling airflow generated at a radially inner portion of fan 18 by radially inner portions of centrifugal fan blades 38, in axial direction 46 to generate axial flow 42. Fan 18 of the embodiments of FIGS. 3A and 3B are constructed to generate axial flow 42 in axial direction 46 regardless of the direction of rotation of fan 18. Deflector ring 66 is constructed to generate axial flow 42 to impinge on side wall 28 for cooling of side wall 28. Deflector ring 66 is concave toward hub 54, and extends from inlet side 30 to back side 32 of fan 18. Deflector ring 66 has a smaller diameter at inlet side 30 than at back side 32.

Figure 4A:
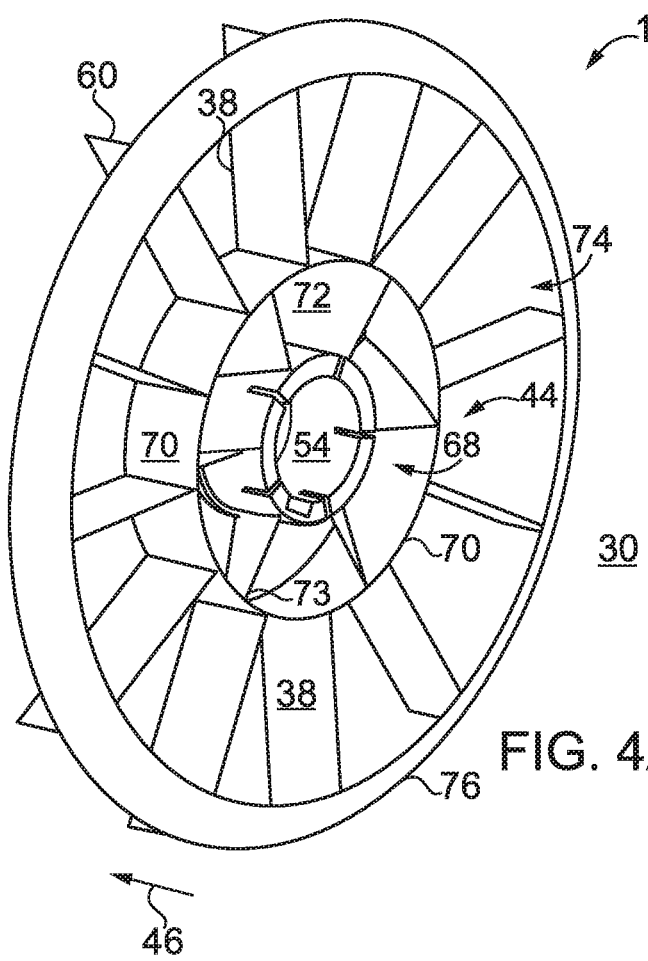
FIGS. 4A and 4B illustrate a front perspective view and a cross-sectional perspective view, receptively, depicting some aspects of a non-limiting example of a fan in accordance with another embodiment of the present invention.
Figure 4B:
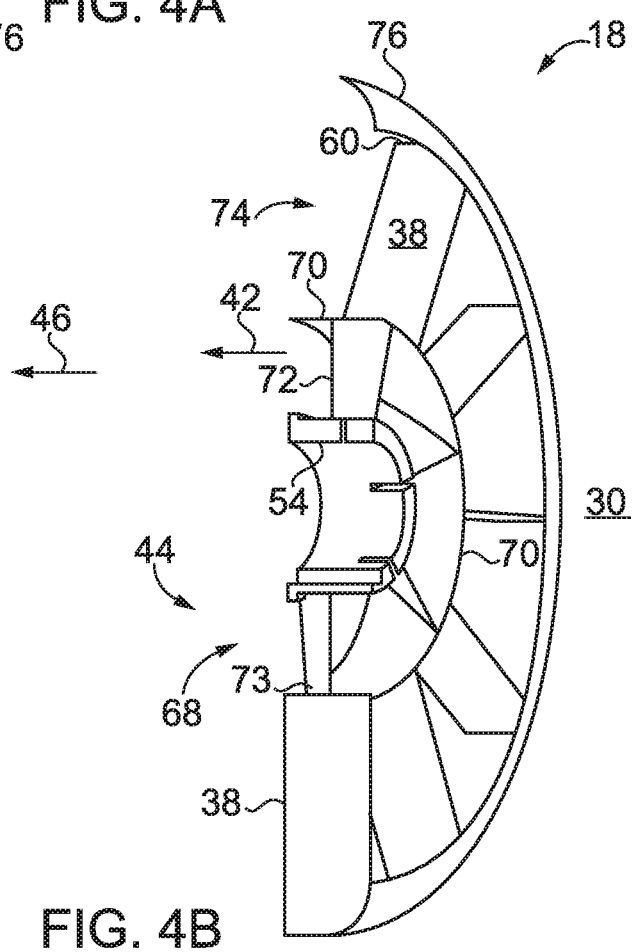

Referring also to FIGS. 4A and 4B, a front perspective view and a cross-sectional perspective view, respectively, illustrate some aspects of a non-limiting example of fan 18 in accordance with another embodiment of the present invention. In the embodiment of FIGS. 4A and 4B, fan 18 includes an axial flow fan portion or axial fan 68 having a shroud ring 70 and a plurality of axial fan blades 72, i.e., axial flow fan blades or blades that generate an axial flow. Shroud ring 70 is disposed radially outward of hub 54. Axial fan blades 72 extend between hub 54 and shroud ring 70, and are coupled to hub 54 and shroud ring 70. In one form, axial fan blades 72 are integral with hub 54 and with shroud ring 70. In other embodiments, axial fan blades 72 may be attached or affixed to one or both of hub 54 and shroud ring 70 and/or may be integral with one or both of hub 54 and shroud ring 70. Each axial fan blade 72 has an axial fan blade tip end 73. In the illustrated embodiment, shroud ring 70 completely covers each axial fan blade tip end 73, forming a shroud for axial fan blades 72.

Axial fan 68, e.g., shroud ring 70 and axial fan blades 72, is constructed to generate axial flow 42, e.g., an axial cooling airflow portion of the cooling airflow 22 generated by fan 18, through a central portion 44 of fan 18. In some embodiments, axial flow fan portion 68 may also or alternatively generate an axial flow through an inner and/or outer portion of fan 18, e.g., depending upon the locations of shroud ring 70 and axial fan blades 72. Axial flow 42 provides cooling to a portion of machine 12. For example, with some machines 12 in the form of a gearbox, a pinion bearing is located inside machine 12 on a portion of input shaft 14 (not shown), which generates heat, and for which cooling is desired. Axial flow fan portion 68 is constructed to provide axial flow 42 and direct axial flow 42 toward side wall 28 to impinge upon side wall 28. For example, axial flow fan portion 68 is constructed to generate axial flow 42 in an axial direction 46 that is parallel to the axis of rotation of input shaft 14. Because the flow is generated in the central portion 44 of fan 18, it impinges upon side wall 28, e.g., in a central portion of side wall 28 opposite the pinion bearing. By impinging upon side wall 28, axial flow 42 provides cooling of such a pinion bearing and/or any other machine 12 components adjacent to or mounted internally or externally on side wall 28 of machine 12 by convecting heat from side wall 28 of machine 12.

Centrifugal fan blades 38 are coupled to shroud ring 70, and extend outward from shroud ring 70. In one form, centrifugal fan blades 38 are integral with shroud ring 70. In other embodiments, centrifugal fan blades 38 may be attached or affixed to shroud ring 70. Axial fan blades 72 are constructed to form axial fan 68 and to generate axial flow 42 through central portion 44 of the fan 18, whereas centrifugal fan blades 38 are constructed to form a centrifugal fan 74 disposed radially outward of the axial fan 68. In one form, centrifugal fan blades 38 are radial blades, and centrifugal fan 74 is a radial fan. In other embodiments, centrifugal fan blades 38 and centrifugal fan 74 may take other forms.

Fan 18 includes a stabilizer ring 76. Each centrifugal fan blade 38 includes a tip end 60. Stabilizer ring 76 is coupled to each centrifugal fan blade 38 tip end 60. Stabilizer ring 76 is constructed to stabilize the tip ends 60 of the centrifugal fan blades 38. In the embodiment of FIGS. 4A and 4B, stabilizer ring 76 is constructed to deflect and direct flow from centrifugal fan blades 38 in axial direction 46, i.e., at the outer periphery of fan 18, parallel to the axial flow 42 generated by axial fan 68. In one form, stabilizer ring 76 is concave toward the centrifugal fan blades 38, having a smaller diameter on the inlet side 30 of fan 18 than at the opposite end of stabilizer ring 76. In other embodiments stabilizer ring 76 may have other geometries. In one form, stabilizer ring 76 is integral with centrifugal fan blades 38. In other embodiments, stabilizer ring 76 may be attached or affixed to centrifugal fan blades 38.

Embodiments of the present invention include a system, comprising: a machine; a centrifugal fan, the centrifugal fan having a plurality of centrifugal fan blades and being constructed to generate a cooling airflow for cooling the machine; and an axial flow inducer disposed on the plurality of centrifugal fan blades, wherein the axial flow inducer is constructed generate an axial flow through a central portion of the centrifugal fan.

In a refinement, the axial flow inducer includes a plurality of axial flow vanes, each axial flow vane disposed on a centrifugal fan blade of the plurality of centrifugal fan blades.

In another refinement, each axial flow vane is disposed on a radially central portion of each corresponding blade.

In yet another refinement, the axial flow inducer is integral with the centrifugal fan blades.

In still another refinement, the centrifugal fan is a radial fan; and wherein each blade is a radial blade.

In yet still another refinement, the centrifugal fan includes a hub and a stabilizer ring; wherein the hub is mounted on the shaft; and wherein the centrifugal fan blades extend from the hub to the stabilizer ring.

In a further refinement, each centrifugal fan blade has a hub end, and is coupled to the hub at the hub end; wherein each centrifugal fan blade has a tip end, and is coupled to the stabilizer ring at the tip end.

In a yet further refinement, the stabilizer ring is constructed to stabilize the tip end of each centrifugal fan blade.

In a still further refinement, the centrifugal fan includes a support disk; wherein each centrifugal fan blade has a hub end; and wherein the hub end of each blade is coupled to the support disk.

In a yet still further refinement, the axial flow inducer is a deflector ring bisecting each centrifugal fan blade; and wherein the deflector ring is constructed to deflect flow in an axial direction.

In another further refinement, wherein the centrifugal fan includes a hub and a stabilizer ring; and wherein the deflector ring bisects each centrifugal fan blade between the hub and the stabilizer ring.

In yet another further refinement, the deflector ring is concave toward the hub.

In still another further refinement, the centrifugal fan has an inlet side and a back side opposite the inlet side; and wherein the deflector ring extends from the inlet side to the back side.

In yet still another further refinement, the deflector ring has a smaller diameter at the inlet side than at the back side.

In an additional refinement, each centrifugal fan blade has a hub end and a tip end; and wherein the deflector ring bisects each centrifugal fan blade at a radially central portion of each fan blade between the hub end and the tip end.

Embodiments of the present invention include a system, comprising: a machine having a shaft extending therefrom; a fan mounted on the shaft and being constructed to generate a cooling airflow for cooling the machine, the fan having: a hub; a shroud ring; a plurality of axial fan blades extending between the hub and the shroud ring and coupled to the hub and the shroud ring, each axial fan blade having an axial fan blade tip end, wherein the shroud ring completely covers each axial fan blade tip end; and a plurality of centrifugal fan blades coupled to the shroud ring and extending outward from the shroud ring, wherein the axial fan blades are constructed to form an axial fan and to generate an axial flow through a central portion of the fan; and wherein the centrifugal fan blades are constructed to form a centrifugal fan disposed outward of the axial fan.

In a refinement, the centrifugal fan blades are radial blades; and wherein the centrifugal fan is a radial fan.

In another refinement, each centrifugal fan blade includes a centrifugal fan blade tip end, further comprising a stabilizer ring coupled to each centrifugal fan blade tip end, wherein the stabilizer ring is constructed to stabilize the tip ends of the centrifugal fan blades.

In yet another refinement, the stabilizer ring is concave toward to the centrifugal fan blades.

In still another refinement, the stabilizer ring is constructed to direct flow from the centrifugal fan blades in an axial direction parallel to the axial flow generated by the axial fan.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system, comprising:
a machine;
a centrifugal fan, the centrifugal fan including a hub and a plurality of centrifugal fan blades that each extend radially outwardly from a hub end at the hub to an outer tip end, wherein the centrifugal fan blades are constructed to generate a cooling airflow for cooling the machine from an inlet side of the centrifugal fan blades to an opposite back side;
a stabilizer ring on the inlet side that connects the outer tip ends of the centrifugal fan blades; and
an axial flow inducer disposed on the plurality of centrifugal fan blades, wherein the axial flow inducer is constructed to generate an axial cooling airflow through a central portion of the centrifugal fan and wherein the axial flow inducer includes:
a deflector ring bisecting each centrifugal fan blade between the hub and the stabilizer ring that is constructed to deflect the cooling airflow in an axial direction, wherein the deflector ring is concave toward the hub and toward the back side, wherein the deflector ring includes one end at the inlet side of each centrifugal fan blade and an opposite end at the back side of each centrifugal fan blade and the deflector ring is concave and is continuously curved from the one end to the opposite end thereof.

2. The system of claim 1, wherein the centrifugal fan is a radial fan.

3. The system of claim 1, wherein the hub is mounted on a shaft.

4. The system of claim 1, wherein the stabilizer ring is constructed to stabilize the tip end of each centrifugal fan blade.

5. The system of claim 1, wherein the centrifugal fan includes a support disk; and wherein the hub end of each blade is coupled to the support disk.

6. The system of claim 1, wherein the deflector ring has a smaller diameter at the inlet side than at the back side.

7. The system of claim 1, wherein the deflector ring bisects each centrifugal fan blade at a radially central portion of each fan blade between the hub end and the tip end.

8. A system, comprising:
a machine having a shaft extending therefrom;
a fan mounted on the shaft and being constructed to generate a cooling airflow for cooling the machine, the fan having:
a hub;
a shroud ring;
a plurality of axial fan blades extending between the hub and the shroud ring and coupled to the hub and the shroud ring, each axial fan blade having an axial fan blade tip end, wherein the shroud ring completely covers each axial fan blade tip end; and
a plurality of centrifugal fan blades coupled to the shroud ring and extending outward from the shroud ring,
wherein the axial fan blades are constructed to form an axial fan and to generate an axial cooling airflow through a central portion of the fan from an inlet side to a back side of the fan; and wherein the centrifugal fan blades are constructed to form a centrifugal fan disposed outward of the axial fan, wherein each centrifugal fan blade includes a centrifugal fan blade tip end, further comprising a concave stabilizer ring coupled to each centrifugal fan blade tip end with the centrifugal fan blade tip ends protrude axially from the concave stabilizer ring and extend to the back side of the fan, wherein the stabilizer ring is constructed to stabilize the centrifugal fan blade tip ends and deflect and direct the cooling airflow from an outer periphery of the centrifugal fan blades in an axial direction parallel to the axial cooling airflow generated by the axial fan.

9. The system of claim 8, wherein the centrifugal fan blades are radial blades; and wherein the centrifugal fan is a radial fan.

10. The system of claim 8, wherein the stabilizer ring is concave toward the centrifugal fan blades.

\* \* \* \* \*